(12) United States Patent
Chang

(10) Patent No.: US 11,620,827 B2
(45) Date of Patent: Apr. 4, 2023

(54) SYSTEM AND METHOD FOR IDENTIFYING ACTIVITY IN AN AREA USING A VIDEO CAMERA AND AN AUDIO SENSOR

(71) Applicant: Honeywell International Inc., Charlotte, NC (US)

(72) Inventor: Hisao Chang, Medina, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 192 days.

(21) Appl. No.: 17/208,542

(22) Filed: Mar. 22, 2021

(65) Prior Publication Data

US 2022/0300741 A1    Sep. 22, 2022

(51) Int. Cl.
*G06V 20/10* (2022.01)
*G06V 20/40* (2022.01)
(Continued)

(52) U.S. Cl.
CPC ............ *G06V 20/46* (2022.01); *G06F 16/634* (2019.01); *G06F 16/635* (2019.01); *G06V 20/10* (2022.01);
(Continued)

(58) Field of Classification Search
CPC ........ G06V 20/46; G06V 20/41; G06V 20/10; G06V 20/53; G06V 20/44; G06F 16/634; G06F 16/635
See application file for complete search history.

(56) References Cited

U.S. PATENT DOCUMENTS

| 6,775,642 B2 | 8/2004 | Remboski et al. |
| 7,683,929 B2 | 3/2010 | Elazar et al. |

(Continued)

FOREIGN PATENT DOCUMENTS

| CN | 103366738 B | 8/2016 |
| CN | 205600145 U | 9/2016 |
| EP | 3193317 A1 | 7/2017 |

OTHER PUBLICATIONS

Saimurugan, et al; "Intelligent Fault Diagnosis for Rotating Machinery Based on Fusion of Sound Signal", International Journal of Prognostics and Health Management, 10 pages, 2016.

(Continued)

*Primary Examiner* — Syed Haider
(74) *Attorney, Agent, or Firm* — Seager, Tufte & Wickhem, LLP

(57) ABSTRACT

Identifying activity in an area even during periods of poor visibility using a video camera and an audio sensor are disclosed. The video camera is used to identify visible events of interest and the audio sensor is used to capture audio occurring temporally with the identified visible events of interest. A sound profile is determined for each of the identified visible events of interest based on sounds captured by the audio sensor during the corresponding identified visible event of interest. Then, during a time of poor visibility, a subsequent sound event is identified in a subsequent audio stream captured by the audio sensor. One or more sound characteristics of the subsequent sound event are compared with the sound profiles associated with each of the identified visible events of interest, and if there is a match, one or more matching sound profiles are filtered out from the subsequent audio stream.

20 Claims, 13 Drawing Sheets

(51) Int. Cl.
*G06F 16/635* (2019.01)
*G06F 16/632* (2019.01)
*G06V 20/52* (2022.01)

(52) U.S. Cl.
CPC .............. *G06V 20/41* (2022.01); *G06V 20/53* (2022.01); *G06V 20/44* (2022.01)

(56) References Cited

U.S. PATENT DOCUMENTS

| | | | |
|---|---|---|---|
| 8,643,539 B2 | 2/2014 | Pauly et al. | |
| 8,938,404 B2 | 1/2015 | Capman et al. | |
| 9,244,042 B2 | 1/2016 | Rank | |
| 9,658,100 B2 | 5/2017 | Park | |
| 9,740,940 B2 | 8/2017 | Chattopadhyay et al. | |
| 10,354,655 B1 | 7/2019 | White et al. | |
| 10,475,468 B1 | 11/2019 | Yelchuru et al. | |
| 10,615,995 B2 | 4/2020 | Yu | |
| 10,755,730 B1 | 8/2020 | Maurer et al. | |
| 2005/0004797 A1 | 1/2005 | Azencott | |
| 2006/0227237 A1* | 10/2006 | Kienzle | G08B 13/194 348/343 |
| 2008/0309761 A1 | 12/2008 | Kienzle et al. | |
| 2012/0008821 A1* | 1/2012 | Sharon | G06V 20/46 382/100 |
| 2012/0245927 A1 | 9/2012 | Bondy | |
| 2013/0057761 A1* | 3/2013 | Bloom | H04N 21/43072 348/E9.034 |
| 2016/0091398 A1 | 3/2016 | Pluemer | |
| 2016/0191268 A1 | 6/2016 | Diebel | |
| 2016/0327522 A1 | 11/2016 | Tanaka et al. | |
| 2016/0330062 A1 | 11/2016 | Alloin et al. | |
| 2018/0040222 A1 | 2/2018 | Findlay et al. | |
| 2018/0358052 A1* | 12/2018 | Miller | G10L 15/26 |
| 2019/0228229 A1* | 7/2019 | Cotoros | H04N 5/23238 |
| 2020/0066257 A1 | 2/2020 | Smith et al. | |
| 2020/0301378 A1 | 9/2020 | McQueen et al. | |
| 2021/0084389 A1* | 3/2021 | Young | H04N 21/23418 |

OTHER PUBLICATIONS

Pan, et al; "Cognitive Acoustic Analytics Service for Internet of Things", 2017 IEEE International Conference on Cognitive Computing (ICCC), 8 pages, Jun. 25-30, 2017.
Scardapane et al; "Microphone Array Based Classification for Security Monitoring in Unstructured Environments", AEU_International Journal of Electronics and Communications, vol. 69, Issue 11, 9 pages, Nov. 2015.
Ntalampiras, et al; "On Acoustic Surveillance of Hazardous Situations", 2009 IEEE International Conference on Acoustics, Speech and Signal Processing, 5 pages, Apr. 19-24, 2009.
Maijala, et al; "Environmental Noise Monitoring Using Source Classification in Sensors", Applied Acoustics, vol. 129, 10 pages, Jan. 2018.
Dey, et al; "Smart City Surveillance: Leveraging Benefits of Cloud Data Stores", First IEEE International Workshop on GLObal Trends in Smart Cities, go SMART 2012, pp. 868-876, Clearwater, 2012.
Foggia et al; "Audio Surveillance of Roads: A System for Detecting Anamalous Sounds," IEEE Transactions on Intelligent Transportation Systems, vol. 17, No. 1, pp. 278-288, Jan. 2016.
Sound effects—Royalty Free FX Library/Pond 5 https://www.pond5.com/sound-effects/ Accessed Mar. 22, 2021.
Street Comer Stock Video Footage, Royalty Free Street Comer Videos, Pond5, retrieved from https://www.pond5.com/stock-footage/tag/street-corner/ on Nov. 17, 2022 (26 pages).

\* cited by examiner

SYSTEM AND METHOD FOR IDENTIFYING ACTIVITY IN AN AREA USING A VIDEO CAMERA AND AN AUDIO SENSOR

TECHNICAL FIELD

The present disclosure relates generally to identifying activity in an area. More particularly, the present disclosure relates to identifying activity in an area using a video camera and an audio sensor.

BACKGROUND

Large cities can employ hundreds or even thousands of video cameras. The video streams produced by these video cameras may be monitored in real time. Recorded video streams may be analyzed to detect problems, identifier troublemakers and the like. However, under some conditions, it can be difficult or impossible to visually identify activity in an area, and in particular human activity that may indicate there is a potential problem. Such conditions may include, for example, heavy rain in the area, low ambient lighting in the area, a temporary or permanent obstruction blocking the activity from the field of view of the video camera, the current field of view of the video camera does not include the activity, and/or any other condition that makes is difficult or impossible to visually identify the activity. Being able to identify activity in an area even when video streams are not able to show that activity would be desirable.

SUMMARY

The present disclosure relates to identifying activity in an area. In one example, a method provides for identifying activity in an area even during periods of low lighting or other adverse condition using a video camera and an audio sensor. The illustrative method includes capturing a legible video using the video camera and processing the legible video to identify one or more visible events of interest. A sound profile is determined for each of the identified visible events of interest based on sounds captured by the audio sensor during the corresponding identified visible event of interest. Each of the identified visible events of interest are associated with the corresponding sound profile. A subsequent sound event is identified in a subsequent audio stream captured by the audio sensor. A determination is made as to whether a legible video can or was captured by the video camera of the identified sound event. When no legible video was captured by the video camera of the identified sound event, one or more sound characteristics of the subsequent sound event are compared with the sound profiles associated with each of the identified visible events of interest, and if there is a match, one or more matching sound profiles are filtered out from the subsequent audio stream, resulting in a filtered audio stream. The filtered audio stream is analyzed for one or more sounds of interest. The one or more sounds of interests may correspond activity in an area, and in some cases, human activity in the area. An abnormality is identified in the one or more sounds of interest and an alert is issued in response.

In another example, a non-transient, computer-readable storage medium has instructions stored thereon. When the instructions are executed by one or more processors, the one or more processors are caused to store a plurality of video streams, where each video stream includes or is associated with a corresponding audio stream, and to perform video analytics on the stored video streams to detect and identify events of interest within the stored video streams. For each of the identified events of interest, a sound profile of sounds that occurred during the identified event of interest is determined. The sound profile for each of the identified events of interest is saved to an audio library, wherein the audio library associates each of the identified events of interest with the corresponding sound profile. The one or more processors are caused to store a subsequently captured audio stream that was captured when a corresponding video stream was not useful in identifying activity and to search the subsequently captured audio stream for sounds that match one or more of the sound profiles in the audio library. The one or more processors are caused to filter out one or more matching sound profiles from the subsequently captured audio stream, resulting in a filtered audio stream, and to analyze the filtered audio stream for one or more sounds of interest.

In another example, a system is provided for identifying activity in an area even during periods of low lighting and/or other adverse conditions. The illustrative system includes a video camera, an audio sensor and a processor that is operably coupled to the video camera and to the audio sensor. The processor is configured to store a legible video from the video camera and to process the legible video in order to identify one or more visible events of interest. The processor is further configured to determine a sound profile for each of the identified visible events of interest based on sounds captured by the audio sensor during the corresponding identified visible event of interest and to associate each of the identified visible events of interest with the corresponding sound profile. The processor is configured to identify a subsequent sound event in a subsequent audio stream captured by the audio sensor and to determine whether a legible video can or was captured by the video camera of the identified sound event. When no legible video was captured by the video camera of the identified subsequent sound event, the processor is configured to compare one or more sound characteristics of the subsequent sound event with the sound profiles associated with each of the identified visible events of interest, and if there is a match, filter out one or more matching sound profiles from the subsequent audio stream, resulting in a filtered audio stream. The processor is configured to analyze the filtered audio stream for one or more sounds of interest.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
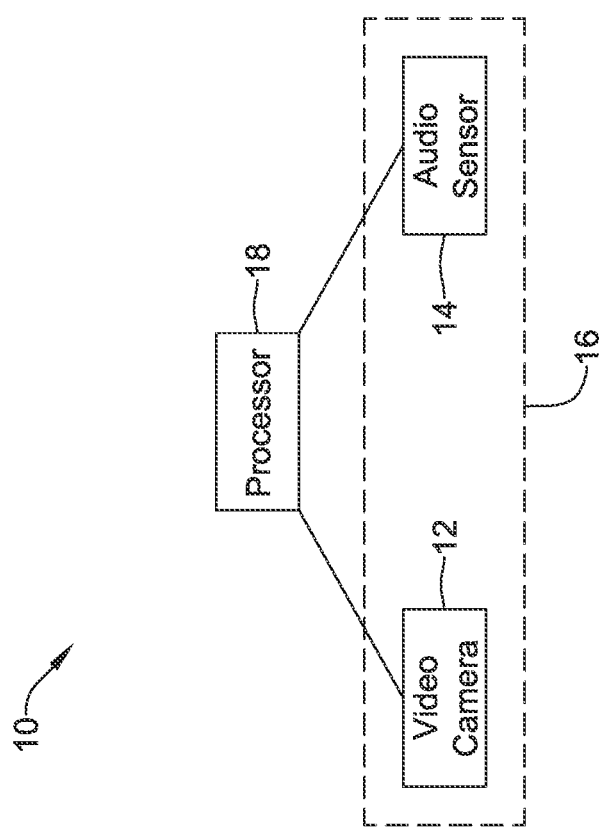
FIG. 1 is a schematic block diagram of a monitoring system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative monitoring system 10 that may be used for identifying activity in an area even during periods of poor visibility. Poor visibility may result from a number of factors, including but not limited to low available lighting, such as if is after dark and localized outdoor lighting is not present or functioning properly. Poor visibility may include obstructions such as trees, buildings, cars and the like that are positioned between a particular video camera and a potential scene of interest. Poor visibility may result from weather conditions such as rain and snow, as well as wind that blows tree branches into a video camera's line of sight. Dirt and dust on a camera lens can result in poor visibility, for example. In some cases, the activity may not be in the current field of view of the video camera, such as a Pan-Tilt-Zoom video camera.

The illustrative monitoring system 10 includes a video camera 12 and an audio sensor 14. In some cases, the video camera 12 and the audio sensor 14 may be distinct pieces of equipment. In some instances, the video camera 12 and the audio sensor 14 may be combined into a single piece of equipment, schematically illustrated as equipment 16. A video camera such as the video camera 12 may itself include a microphone or other audio sensor that functions as the audio sensor 14.

The video camera 12 and the audio sensor 14 are both operably coupled with a processor 18. While a single video camera and a single audio sensor 14 are shown, it will be appreciated that the monitoring system 10 may include any number of video cameras and audio sensors, or any number of video cameras with integral microphones. The processor 18 is configured to store a legible video from the video camera 12 and to process the legible video in order to identify one or more visible events of interest. The processor 18 is configured to determine a sound profile for each of the identified visible events of interest based on sounds captured by the audio sensor 14 during the corresponding identified visible event of interest, and to associate each of the identified visible events of interest with the corresponding sound profile. In one particular example, the processor may identify a bus passing by in the legible video, and may determine a bus passing sound profile based on the sounds captured by the audio sensor 14 of the passing bus. The processor may associate the bus passing sound profile with the bus passing event. In some cases, a refined bus passing sound profile may be determined by combining bus passing sound profiles for each of multiple bus passing events. While a bus passing event is used in this example, it is contemplated that that present disclosure may be used with respect to any suitable event of interest.

In any event, the processor 18 is configured to identify a subsequent sound event in a subsequent audio stream captured by the audio sensor 14 and to determine whether a legible video can or was captured by the video camera 12 of the identified sound event. When no legible video was captured by the video camera of the identified subsequent sound event, such as because of poor visibility, the processor 18 is configured to compare one or more sound characteristics of the subsequent sound event with the sound profiles previously associated with each of the identified visible events of interest, and if there is a match, filter out one or more matching sound profiles from the subsequent audio stream, resulting in a filtered audio stream. The processor 18 is configured to analyze the filtered audio stream for one or more sounds of interest. Continuing with the bus passing event example above, if the subsequent sound event has characteristics that match the bus passing sound profile, the bus passing sound profile (e.g. spectral components associated with the bus passing sound profile) may be filtered out of the subsequently captured sound event, leaving behind one or more sounds of interest such as talking, shouting, chanting, screaming, laughing, sneezing, coughing, walking footsteps and running footsteps. In some cases, the processor 18 is configured to carry out the methods that are outlined in the flow diagrams of FIGS. 3 through 13.

Figure 2:
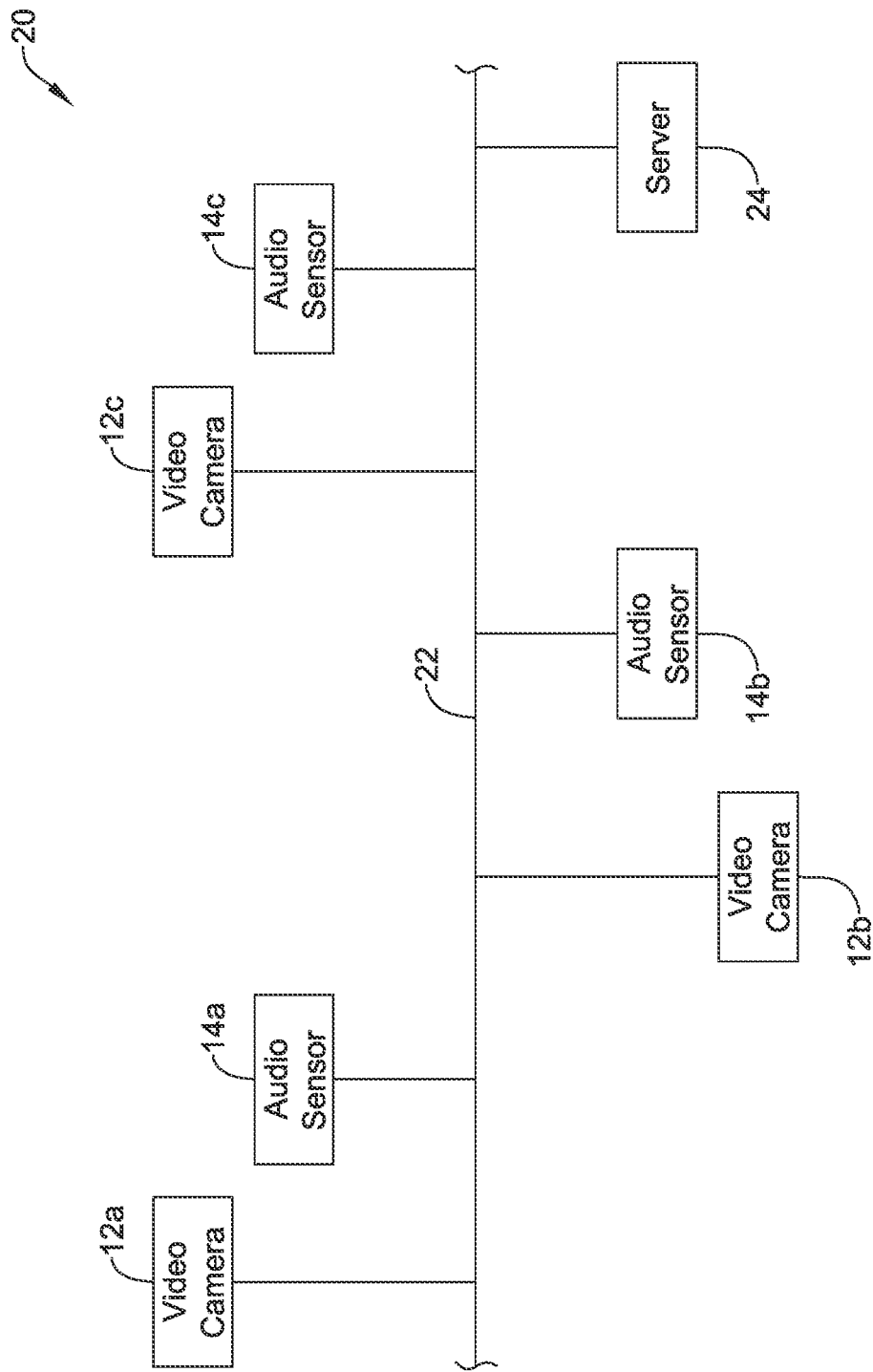
FIG. 2 is a schematic block diagram of a monitoring system.

FIG. 2 is a schematic block diagram of an illustrative monitoring system 20. The monitoring system 20 may be considered as being an expansion of the monitoring system 10. Rather than a single video camera 12 and a single audio sensor 14 operably coupled with a single processor 18, the illustrative monitoring system 20 includes a plurality of video cameras 12, individually labeled as 12*a*, 12*b*, 12*c*, and a plurality of audio sensors 14, individually labeled as 14*a*, 14*b*, 14*c*. While a total of three video cameras 12 and three audio sensors 14 are shown, it will be appreciated that the monitoring system 20 may include any number of video cameras 12 and audio sensors 14. Some of the video cameras 12 may include integral microphones or other audio sensors 14, and some of the video cameras 12 may be paired with separate audio sensors 14.

Each of the video cameras 12 and the audio sensors 14 are operably coupled to a network 22. The network 22 may extend through a neighborhood, or even an entire city (e.g. smart city). The network 22 may be considered as being a Local Area Network (LAN) and/or a Wide Area Network (WAN), for example. In the example shown, a server 24 is operably coupled to the network 22, and as a result the server 24 is able to receive, store and analyze video streams from the video cameras 12 as well as receiving, storing and analyzing corresponding audio streams from the audio sensors 14. The server 24 may receive video and audio streams from all over a city, for example. While not illustrated, the server 24 may be in communication with a Control and Command center in a smart city. The Control and Command center may, for example, be configured to display videos on a video wall. The server 24 may be considered as including any and all functionality ascribed to the processor 18, for example, and may be configured to carry out the methods that are outlined in the flow diagrams of FIGS. 3 through 13.

Figure 3:
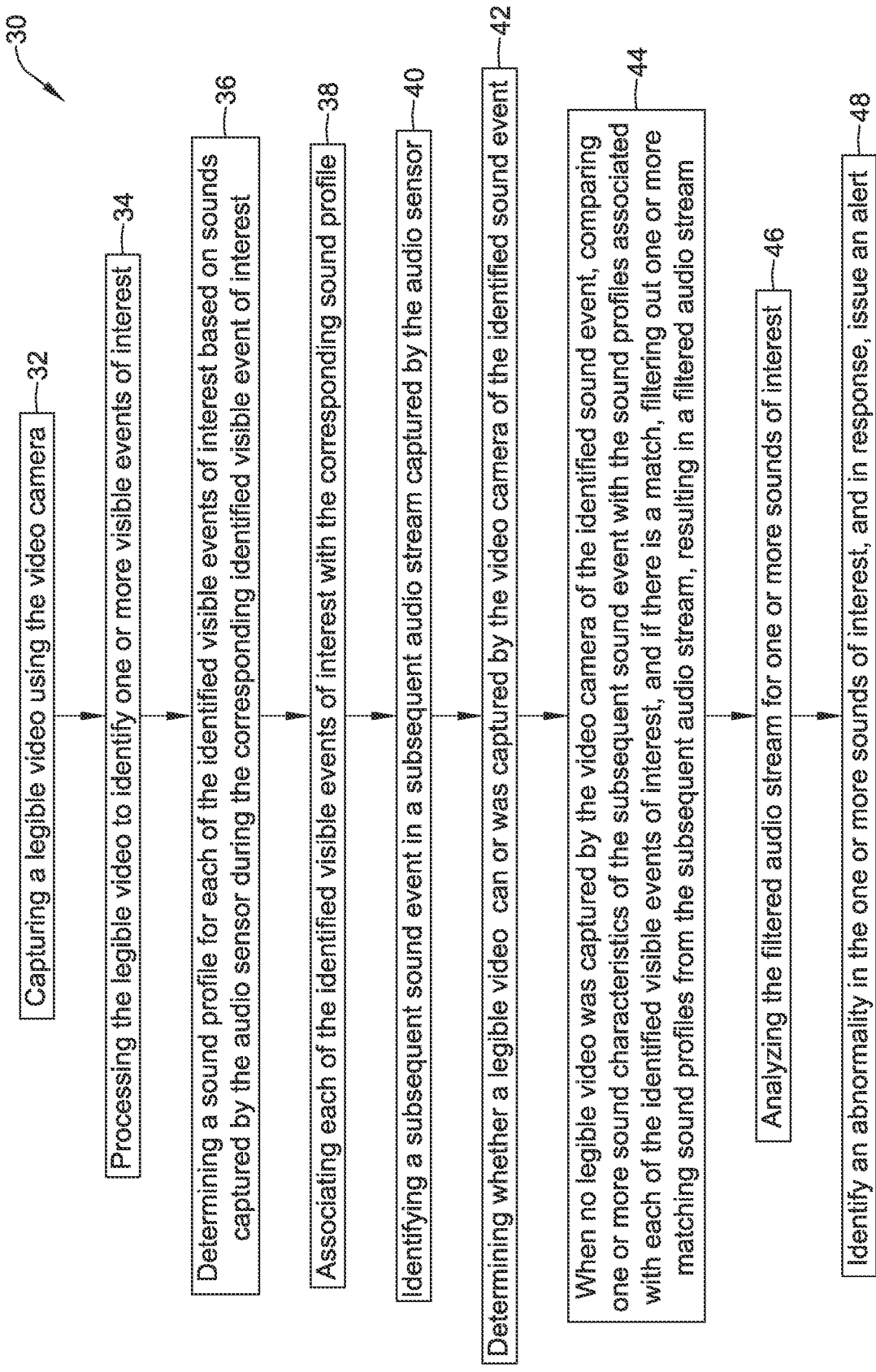
FIG. 3 is a flow diagram showing an illustrative method.

FIG. 3 is a flow diagram showing an illustrative method 30 for identifying activity in an area even during periods of poor visibility such as low lighting or other adverse conditions. The method utilizes a video camera (such as the video camera 12) and an audio sensor (such as the audio sensor 14). Poor visibility may result from a number of factors, including but not limited to low available lighting, such as if is after dark and localized outdoor lighting is not present of functioning properly. Poor visibility may include obstructions such as trees, buildings, cars and the like that are positioned between a particular video camera and a potential scene of interest. Poor visibility may result from weather conditions such as rain and snow, as well as wind that blows tree branches into a video camera's line of sight. Dirt and dust on a camera lens can result in poor visibility, for example. In some cases, the activity may not be in the current field of view of the video camera, such as a Pan-Tilt-Zoom video camera.

The illustrative method 30 includes capturing a legible video using the video camera, as indicated at block 32. The legible video is processed in order to identify one or more visible events of interest, as indicated at block 34. In some instances, processing the legible video to identify one or more visible events of interest may include identifying one or more moving objects in the legible video. A sound profile is determined for each of the identified visible events of interest based on sounds captured by the audio sensor during the corresponding identified visible event of interest, as indicated at block 36. In some cases, determining the sound profile may include identifying sounds captured by the audio sensor that occurred temporally with the identified one or more moving objects, and determining the sound profile based on the identified sounds that occurred temporally with the identified one or more moving objects.

Each of the identified visible events of interest are associated with the corresponding sound profile, as indicated at block 38. A subsequent sound event is identified in a subsequent audio stream captured by the audio sensor, as indicated at block 40. A determination as to whether a legible video can or was captured by the video camera of the identified sound event is made, as indicated at block 42. In some cases, a legible video was not captured because of poor visibility. In some cases, a legible video was not captured because the field of view of a particular video camera did not show a source of the subsequent sound event. This may be because the particular video camera was not properly placed or orientated to capture the source of the subsequent sound event, or because at least part of the field of view of the particular video camera was at least partially obscured. These are just examples. In some instances, capturing of a subsequent sound event is triggered when the captured sound exceeds a threshold sound level, such as a threshold sound level of 25 decibels (dB), or 50 dB, or 75 dB, for example.

When no legible video was captured by the video camera of the source of the identified sound event, one or more sound characteristics of the subsequent sound event are compared with the sound profiles previously associated with each of a plurality of identified visible events of interest, and if there is a match, one or more matching sound profiles are filtered out from the subsequent audio stream, resulting in a filtered audio stream, as indicated at block 44.

Determining the sound profile for each of the identified visible event of interest may include computing an audio feature vector for the sounds that occurred during the corresponding identified visible event of interest. The audio feature vector may, for example, include one or more spectral components. Filtering out one or more matching sound profiles from the subsequent audio stream may include applying spectral filtering to the subsequent audio stream based on the one or more spectral components of the matching sound profile(s).

The filtered audio stream is then analyzed for one or more sounds of interest, as indicated at block 46. Examples of possible sounds of interest include but are not limited to talking, shouting, chanting, screaming, laughing, sneezing, coughing, walking footsteps and running footsteps. An abnormality is identified in the one or more sounds of interest, and in response, issue an alert, as indicated at block 48.

Figure 4:
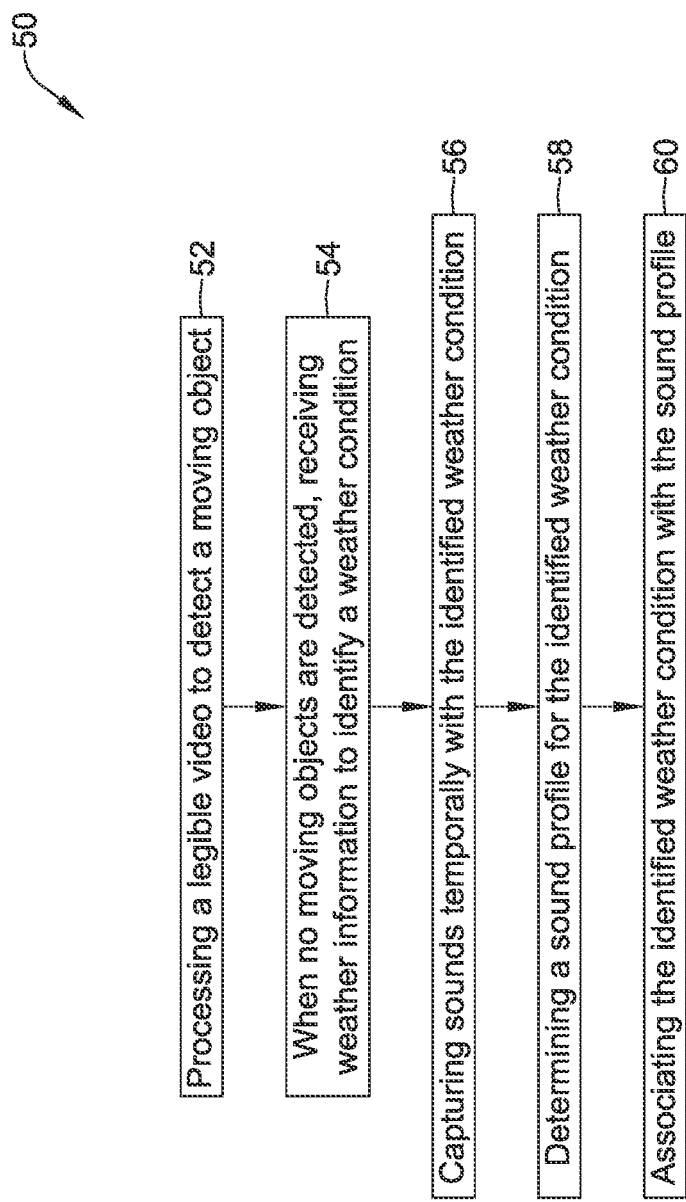
FIG. 4 is a flow diagram showing an illustrative method.

FIG. 4 is a flow diagram showing an illustrative method 50 for identifying activity in an area even during periods of poor visibility such as low lighting. The illustrative method utilizes a video camera (such as the video camera 12) and an audio sensor (such as the audio sensor 14). Poor visibility may result from a number of factors, including but not limited to low available lighting, such as if is after dark and localized outdoor lighting is not present or functioning properly. Poor visibility may include obstructions such as trees, buildings, cars and the like that are positioned between a particular video camera and a potential scene of interest. Poor visibility may result from weather conditions such as rain and snow, as well as wind that blows tree branches into a video camera's line of sight. Dirt and dust on a camera lens can result in poor visibility, for example. In some cases, the activity may not be in the current field of view of the video camera, such as a Pan-Tilt-Zoom video camera.

The method 50 includes processing a legible video to detect a moving object, as indicated at block 52. When no moving objects are detected, weather information is received in order to identify a weather condition, as indicated at block 54. Weather conditions may include rain or thunder, for example, or perhaps wind and/or wind direction. The method 50 includes capturing sounds temporally with the identified weather condition, as indicated at block 56. A sound profile for the identified weather condition is determined, as indicated at block 58. The identified weather condition is associated with the corresponding weather sound profile, as indicated at block 60.

When no legible video is captured by the video camera, one or more sound characteristics of a subsequent sound event may be compared with the weather sound profile(s) previously associated with each of a plurality of weather conditions, and if there is a match, one or more matching weather sound profiles may be filtered out from the subsequent audio stream, resulting in a filtered audio stream, as indicated at block 44. In some cases, the matching weather sound profiles are filtered out in addition to filtering out matching sound profiles associated with visible events of interest.

Figure 5:
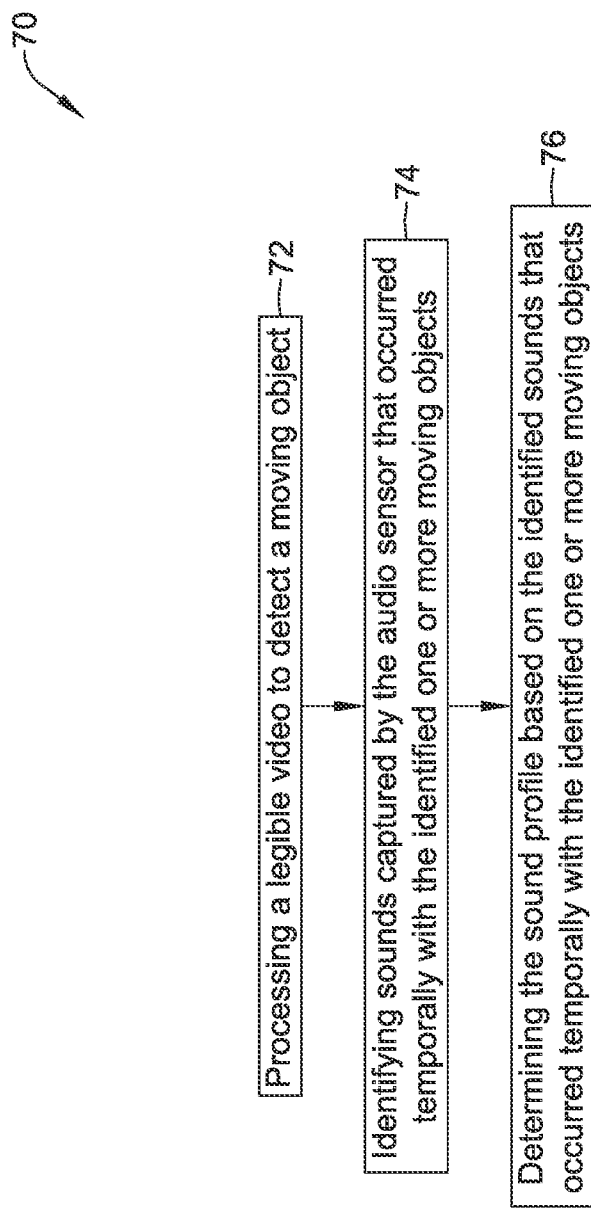
FIG. 5 is a flow diagram showing an illustrative method.

FIG. 5 is a flow diagram showing an illustrative method 70 for identifying activity in an area even during periods of poor visibility such as low lighting. The method utilizes a video camera (such as the video camera 12) and an audio sensor (such as the audio sensor 14). Poor visibility may result from a number of factors, including but not limited to low available lighting, such as if is after dark and localized outdoor lighting is not present or functioning properly. Poor visibility may include obstructions such as trees, buildings, cars and the like that are positioned between a particular video camera and a potential scene of interest. Poor visibility may result from weather conditions such as rain and snow, as well as wind that blows tree branches into a video camera's line of sight. Dirt and dust on a camera lens can result in poor visibility, for example. In some cases, the activity may not be in the current field of view of the video camera, such as a Pan-Tilt-Zoom video camera.

The illustrative method 70 includes processing a legible video to detect a moving object, as indicated at block 72. The method 70 includes identifying sounds that were captured by the audio sensor that occurred temporally with the identified one or more moving objects, as indicated at block 74. A sound profile is determined that is based on the identified sounds that occurred temporally with the identified one or more moving objects, as indicated at block 76.

Figure 6:
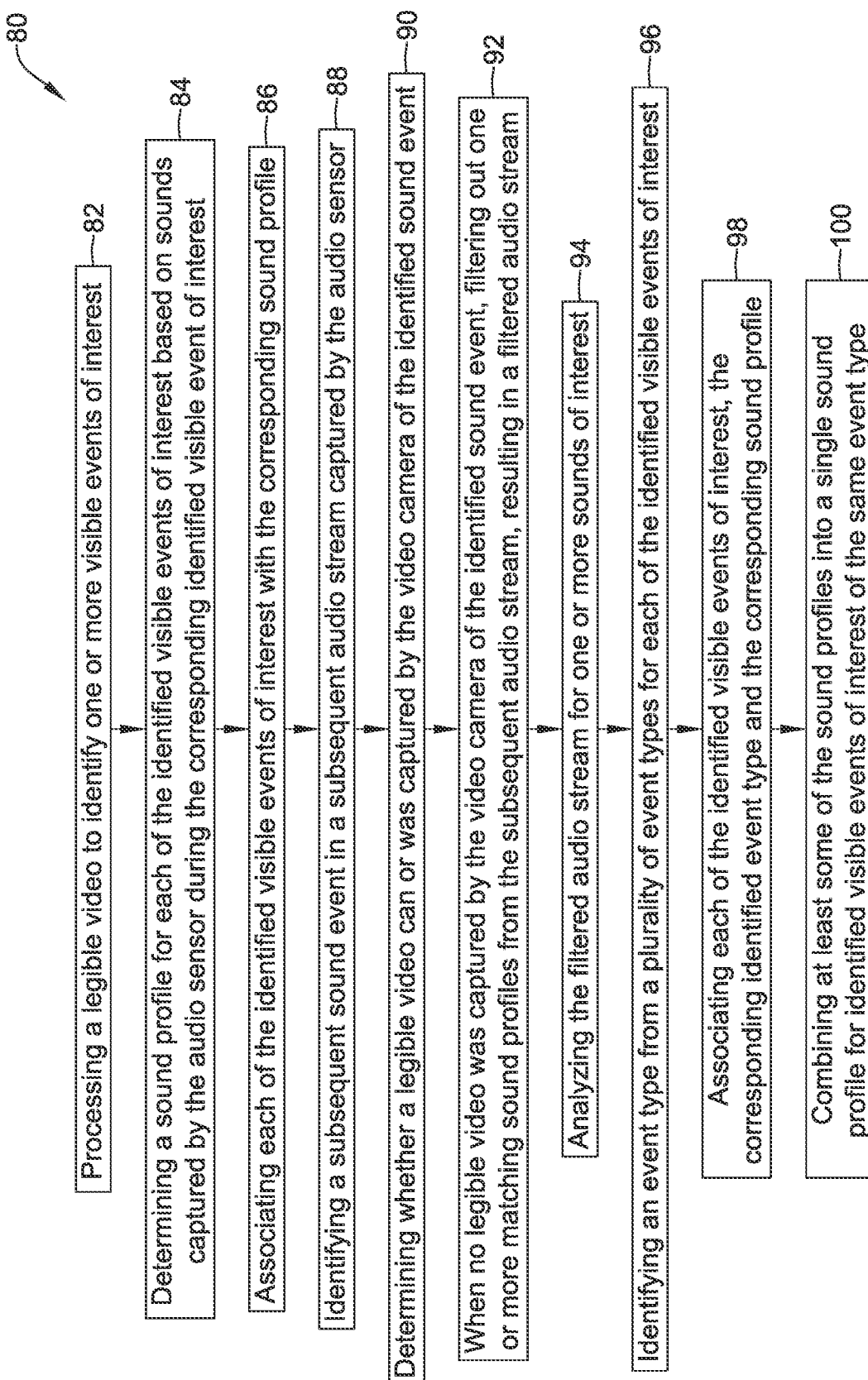
FIG. 6 is a flow diagram showing an illustrative method.

FIG. 6 is a flow diagram showing an illustrative method 80 for identifying activity in an area even during periods of poor visibility such as low lighting. The method utilizes a video camera (such as the video camera 12) and an audio sensor (such as the audio sensor 14). Poor visibility may result from a number of factors, including but not limited to low available lighting, such as if is after dark and localized outdoor lighting is not functioning properly. Poor visibility may include obstructions such as trees, buildings, cars and the like that are positioned between a particular video camera and a potential scene of interest. Poor visibility may result from weather conditions such as rain and snow, as well as wind that blows tree branches into a video camera's line of sight. Dirt and dust on a camera lens can result in poor visibility, for example. In some cases, the activity may not be in the current field of view of the video camera, such as a Pan-Tilt-Zoom video camera.

The illustrative method 80 includes processing a legible video to identify one or more visible events of interest, as indicated at block 82. A sound profile is determined for each of the identified visible events of interest based on sounds captured by the audio sensor during the corresponding identified visible event of interest, as indicated at block 84. In some cases, determining the sound profile may include identifying sounds captured by the audio sensor that occurred temporally with the identified one or more moving objects, and determining the sound profile based on the identified sounds that occurred temporally with the identified one or more moving objects.

Each of the identified visible events of interest are associated with the corresponding sound profile, as indicated at block 86. A subsequent sound event is identified in a subsequent audio stream captured by the audio sensor, as indicated at block 88. A determination as to whether a legible video can or was captured by the video camera of the identified sound event is made, as indicated at block 90. In some cases, a legible video was not captured because of poor visibility at the time. In some cases, a legible video was not captured because a field of view of a particular video camera did not show a source of the subsequent sound event. This may be because the particular video camera was not properly placed or orientated to capture the source of the subsequent sound event, or because at least part of the field of view of the particular video camera was at least partially obscured. In some instances, capturing of a subsequent sound event is triggered when the captured sound exceeds a threshold sound level, such as a threshold sound level of 25 decibels (dB), or 50 dB, or 75 dB, for example.

When no legible video was captured by the video camera of the identified sound event, one or more matching sound profiles are filtered out from the subsequent audio stream, resulting in a filtered audio stream, as indicated at block 92. Determining the sound profile for an identified visible event of interest may include computing an audio feature vector for the sounds that occurred during the corresponding identified visible event of interest. The audio feature vector may, for example, include one or more spectral components, and filtering out one or more matching sound profiles from the subsequent audio stream may include applying spectral filtering to the subsequent audio stream based on the one or more spectral components of the matching sound profiles. The filtered audio stream is analyzed for one or more sounds of interest, as indicated at block 94. Examples of possible sounds of interest include but are not limited to talking, shouting, chanting, screaming, laughing, sneezing, coughing, walking footsteps and running footsteps.

In some cases, an event type is identified from a plurality of event types for each of the identified visible events of interest, as indicated at block 96. Each of the identified visible events of interest, the corresponding identified event type and the corresponding sound profile are associated, as indicated at block 98. At least some of the sound profiles are combined into a refined sound profile for identified visible events of interest of the same event type, as indicated at block 100. The refined sound profile(s) may then be used when attempting to identifying one or more sound profiles that match a subsequent audio stream when no legible video can or was captured of the identified sound event of the subsequent audio stream. This is just an example.

Figure 7:
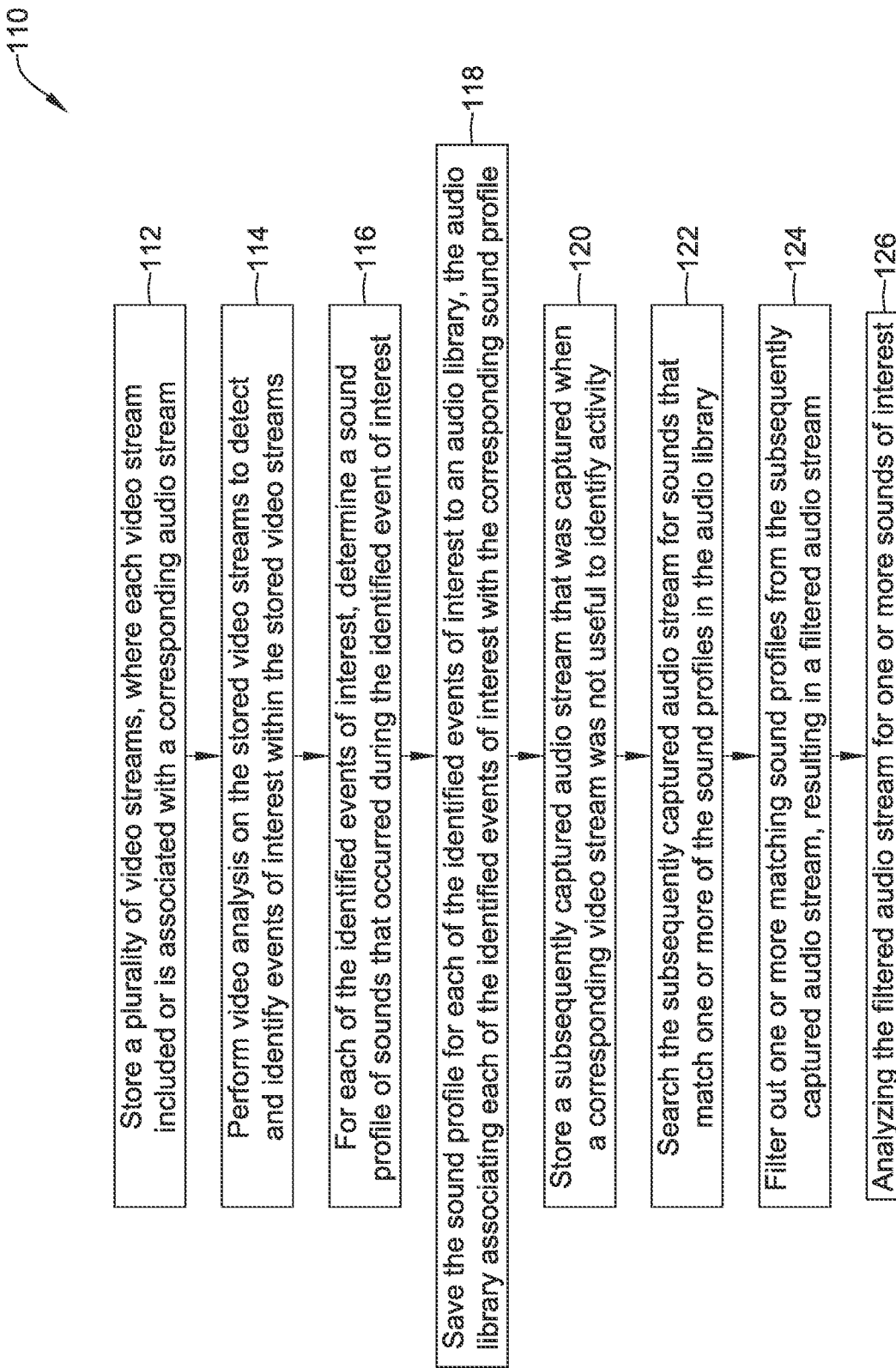
FIG. 7 is a flow diagram showing an illustrative method.

FIG. 7 is a flow diagram showing an illustrative method 110 that may be carried out by the processor 18 and/or the server 24. The illustrative method 110 may be manifested as executable instructions that are stored on a non-transient, computer-readable storage medium. When the executable instructions are executed by one or more processors (such as the processor 18 or processors forming part of the server 24), the one or more processors are caused to store a plurality of video streams, where each video stream includes or is associated with a corresponding audio stream, as indicated at block 112. The one or more processors are caused to perform video analytics on the stored video streams to detect and identify events of interest within the stored video streams, as indicated at block 114. In some cases, performing video analytics on the stored video streams includes analyzing a video stream to find a moving object and, for each of the identified events of interest that correspond to a moving object, determine the sound profile based on sounds that occurred temporally with the moving object.

For each of the identified events of interest, a sound profile of sounds that occurred during the identified event of interest is determined, as indicated at block 116. The one or more processors are caused to save the sound profile for each of the identified events of interest to an audio library. The audio library associates each of the identified events of interest with the corresponding sound profile, as indicated at block 118. The one or more processors are caused to store a subsequently captured audio stream that was captured when a corresponding video stream was not useful to identify activity, as indicated at block 120. The one or more processors are caused to search the subsequently captured audio stream for sounds (e.g. frequency spectra, amplitude, etc.) that match one or more of the sound profiles in the audio library, as indicated at block 122. The one or more processors are caused to filter out one or more matching sound profiles from the subsequently captured audio stream, resulting in a filtered audio stream, as indicated at block 124, and to analyze the filtered audio stream for one or more sounds of interest, as indicated at block 126. The one or more sounds of interest may include, for example, talking, shouting, chanting, screaming, laughing, sneezing, coughing, walking footsteps and running footsteps.

In some cases, the one or more processors are caused to identify an event type from a plurality of event types for each of the identified events of interest. The audio library may associate each of the identified events of interest, the corresponding identified event type and the corresponding sound profile, and then combine at least some of the sound profiles into a refined sound profile for identified events of interest of the same event type. The refined sound profile(s) may then be used when attempting to identifying one or more sound profiles that match a subsequently captured audio stream when the video stream was not useful in identifying the activity. This is just an example.

In some instances, it may be possible that an event may be seen with a first camera at a first location, such as an elevated train passing by, a plane flying overhead or a bus passing by, while the event may be heard (but possibly not seen) at a nearby second location. In some cases, the one or more processors may, for example, associate the seen event (at the first location) with the heard event (at the first location and the second location). The sound profiles for the event may be different for the first location and the second location because of different acoustics. Amplitude may be less if further away, for example. There may be an echo heard at one of the locations but not at the other of the locations. During subsequent operation under poor visibility, subsequent heard events at the first and second locations can be compared to their respective sound profiles to see if there is a match. In some cases, it is possible to build up the audio library so that events that can never be seen by the second camera, for example, can still be identified under poor visibility conditions In some cases, the one or more processors may be configured to determine when a sound level exceeds a sound threshold sound level, such as a threshold sound level of 25 decibels (dB), or 50 dB, or 75 dB, for example. When a sound level exceeds the sound threshold sound level, the one or more processors may be caused to perform video analytics on the video streams to detect and identify events of interest that correspond to one or more moving objects in the stored video streams.

In some cases when no moving objects are detected, weather information is received and is used to identify a weather event of interest. For each of the identified weather events of interest, the one or more processors are caused to determine a sound profile from the corresponding audio stream using sounds that occurred temporally to the corresponding weather event of interest and to save the sound profile for each of the identified weather events of interest to the audio library.

When no legible video is captured by the video camera, one or more sound characteristics of a subsequently captured audio stream may be compared with the various weather sound profile(s) previously associated with each of a plurality of weather events, and if there is a match, one or more matching weather sound profiles may be filtered out from the subsequently captured audio stream, resulting in a filtered audio stream. In some cases, the matching weather sound profiles are filtered out in addition to filtering out matching sound profiles associated with visible events of interest.

In some cases, determining the sound profile from the corresponding audio stream using sounds that occurred during the identified event of interest may include computing an audio feature vector for the sounds that occurred during the identified event of interest. The sounds of interest may include one or more of talking, shouting, chanting, screaming, laughing, sneezing, coughing, walking footsteps, and running footsteps. The one or more processors may be caused to identify an abnormality in the one or more sounds of interest, and in response, issue an alert.

FIGS. 8 through 11 are flow diagrams together illustrating an illustrative method of using video analytics on video streams to identify sounds that are captured temporally with the video streams. When lighting or other conditions render video surveillance suspect or even unusable, those identified sounds may be used to filter subsequently captured audio streams to remove sounds that are unrelated to human activity, which then makes it easier to detect and identify various sounds that are related to human activity. The sounds of moving objects, such as planes, automobiles, buses, trucks and the like can be identified using legible video, and then those identified sounds can be used to remove or filter those sounds from subsequent audio streams. Sounds that occur when no motion is detected, such as wind noise, snow, sleet and rain and the like, can also be removed or filtered out in order to make it easier to detect sounds of human activity, such as a person or people walking or running, or talking, or shouting, for example.

Acoustic profiles may include several categories of sounds, including Type One sounds and Type Two sounds. In this example, type One sounds refer to background sounds that are generated by a variety of different mechanical devices. Examples include moving vehicles such as cars, trucks, buses, ambulances, firetrucks and sanitation trucks. Examples include trains such as above-ground light rail cars and elevated monorail cars. Examples also include drilling machines, motorized tools, hammers, and any other mechanical, electrical or electromechanical tools that may be used by a variety of different construction workers.

Type Two sounds refer to weather-related acoustic events such as wind, rain or thunderstorms. Type Two sounds may be identified using static frames, in which no motion is detected. For identifying Type Two sounds, there may be several steps in identifying these. In a first step, all video frames that are recorded during a time period corresponding to a weather condition are selected from recorded video/audio. Any video frames that include motion are excluded. Audio tracks are extracted from the remaining frames that represent the weather condition within various sections of the urban area during the time period(s) in question.

Figure 8:
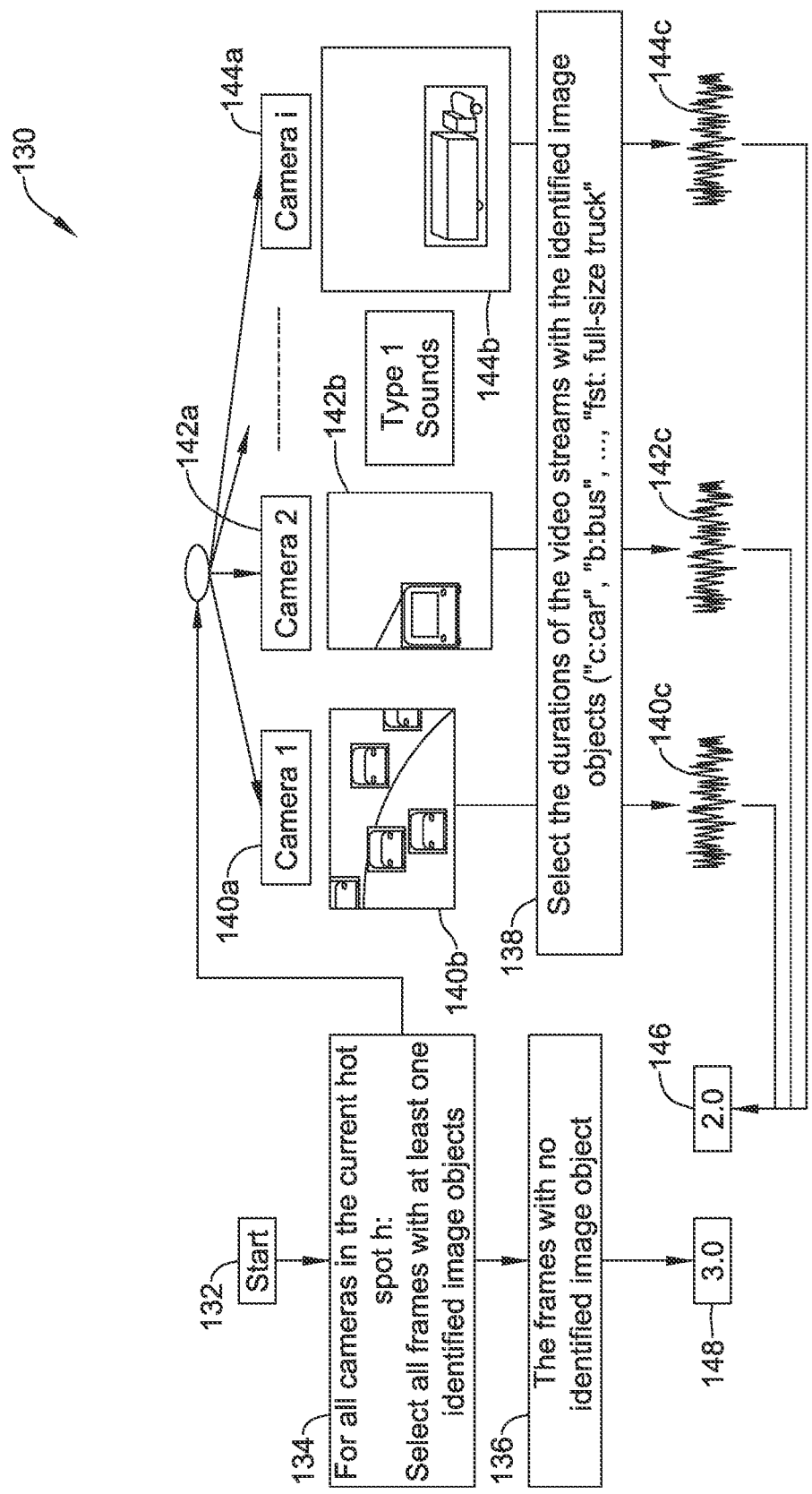
FIGS. 8 through 11 are flow diagrams together illustrating an illustrative method.

FIG. 8 shows a method 130 that starts at a START point 132. At block 134, all cameras for a current hot spot "h" are analyzed. All frames that include at least one identified object are selected. At block 136, the frames that do not have any identified objects are selected. For these frames, control passes to anchor 148, which is repeated in FIG. 10.

For selected frames that include at least one identified image object (block 134), durations of video streams are selected that include each of a variety of different moving objects, as indicated at block 138. For example, CAMERA 1 labeled 140*a* may be showing a car, CAMERA 2 labeled 142*a* may be showing a bus and CAMERA i labeled 144*a* may be showing a full size truck, as seen for example in respective images 140*b*, 142*b* and 144*b*. Corresponding audio selections 140*c*, 142*c* and 144*c* may be selected, as indicated. Control then passes to anchor 146, which is repeated in FIG. 9.

Figure 9:
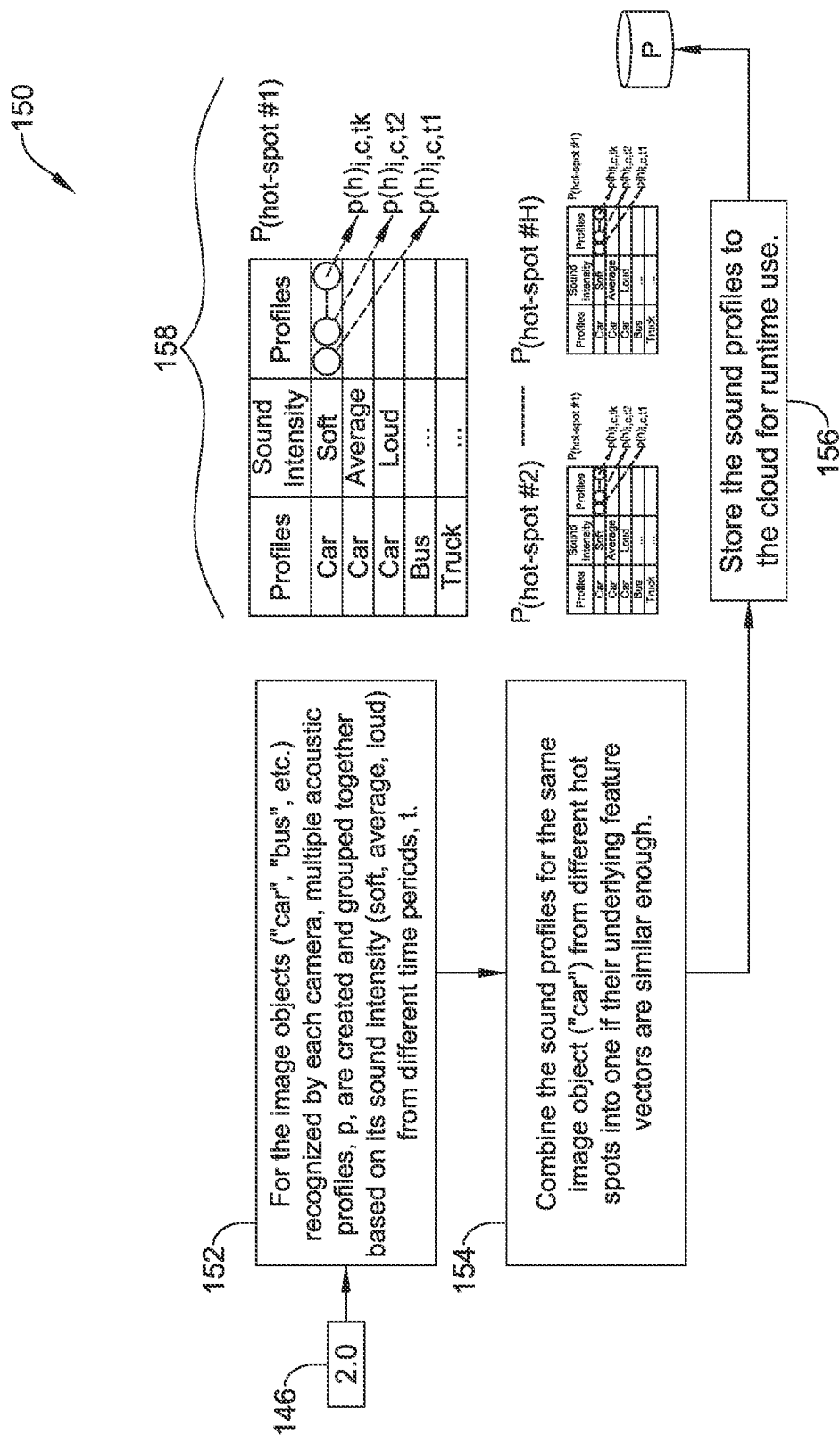

FIG. 9 shows a method 150, which continues on from the anchor 146. The method 150 pertains to sounds created by moving objects. As indicated at block 152, for each of the recognized objects, multiple acoustic profiles are created and may be grouped together based on sound intensity from different time periods. At block 154, the sound profiles for a particular object are grouped together as one if their underlying feature vectors are sufficiently similar (e.g. have spectra that fall within 10% of each other). At block 156, the sound profiles are saved to the cloud for subsequent run-time use. The cloud may, for example, be part of the server 24. Alternatively, the server 24 may be cloud-based, and the sound profiles may be saved to memory within the cloud. Section 158 provides examples of different sound profiles.

Figure 10:
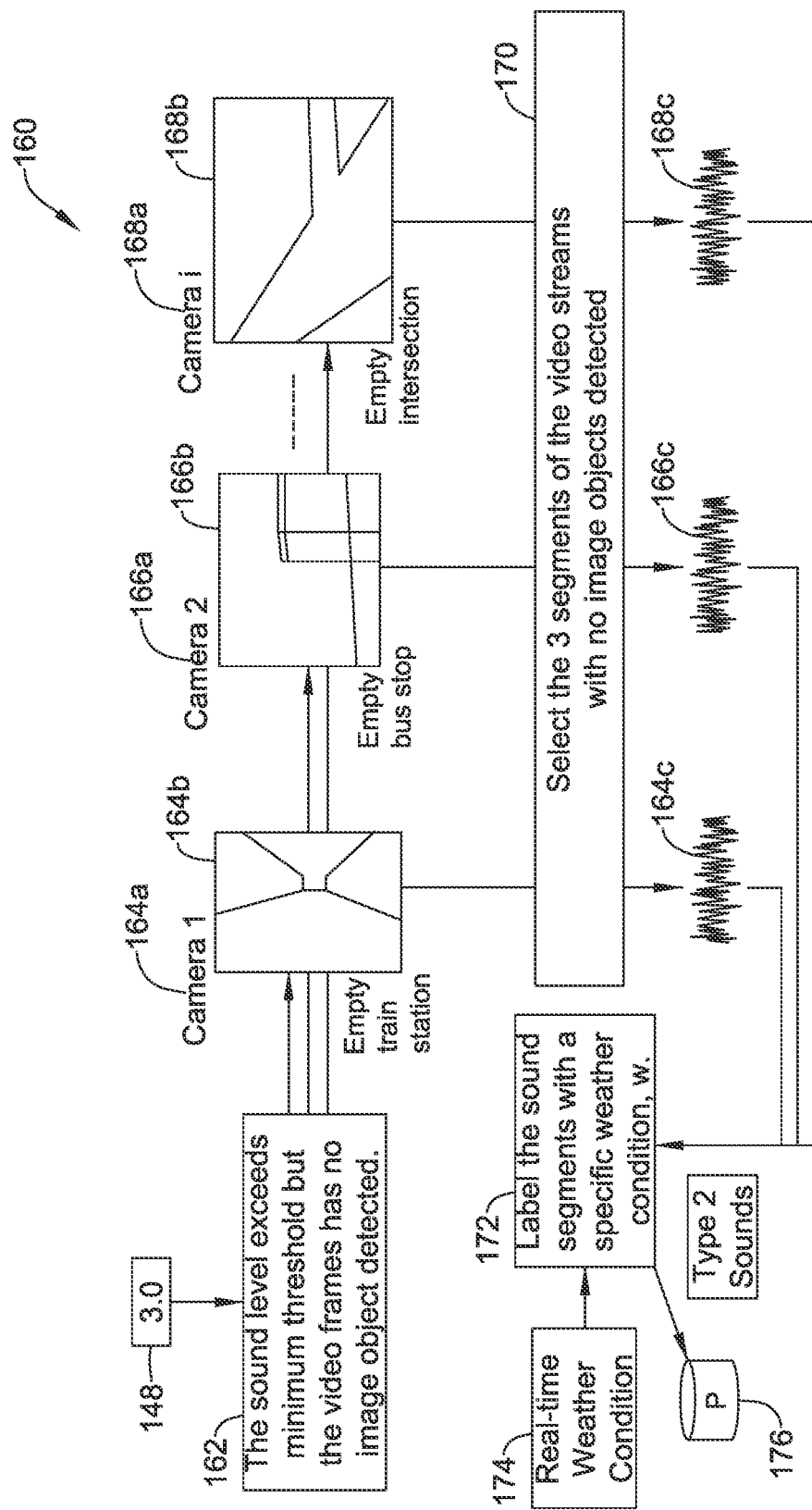

FIG. 10 shows a method 160, which continues on from the anchor 148 of FIG. 8. The method 160 pertains to weather-related sounds, rather than man-made sounds. Block 162 indicates that detected sound levels exceed a minimum threshold, but the video frames do not include any detected images of objects such as moving objects. In this example, a CAMERA 1 labeled 164*a* shows an empty train station as referenced in image 164*b*, a CAMERA 2 labeled 166*a* shows an empty bus station as referenced in image 166*b* and a CAMERA i labeled 168*a* shows an empty intersection as referenced in image 168*b*. As indicated at block 170, these segments of video streams with no movement are selected. Corresponding audio selections 164*c*, 166*c* and 168*c* may be selected, as indicated. The audio selections 164*c*, 166*c*, 168*c* are provided to a block 172, where the sound segments are labeled in accordance with specific weather conditions. The weather conditions are provided to the block 172 via a real-time weather source 174, such as through an API with an on-line weather service. The labeled sound segments, which are of course Type Two sounds, are stored or otherwise saved in a memory 176.

Figure 11:
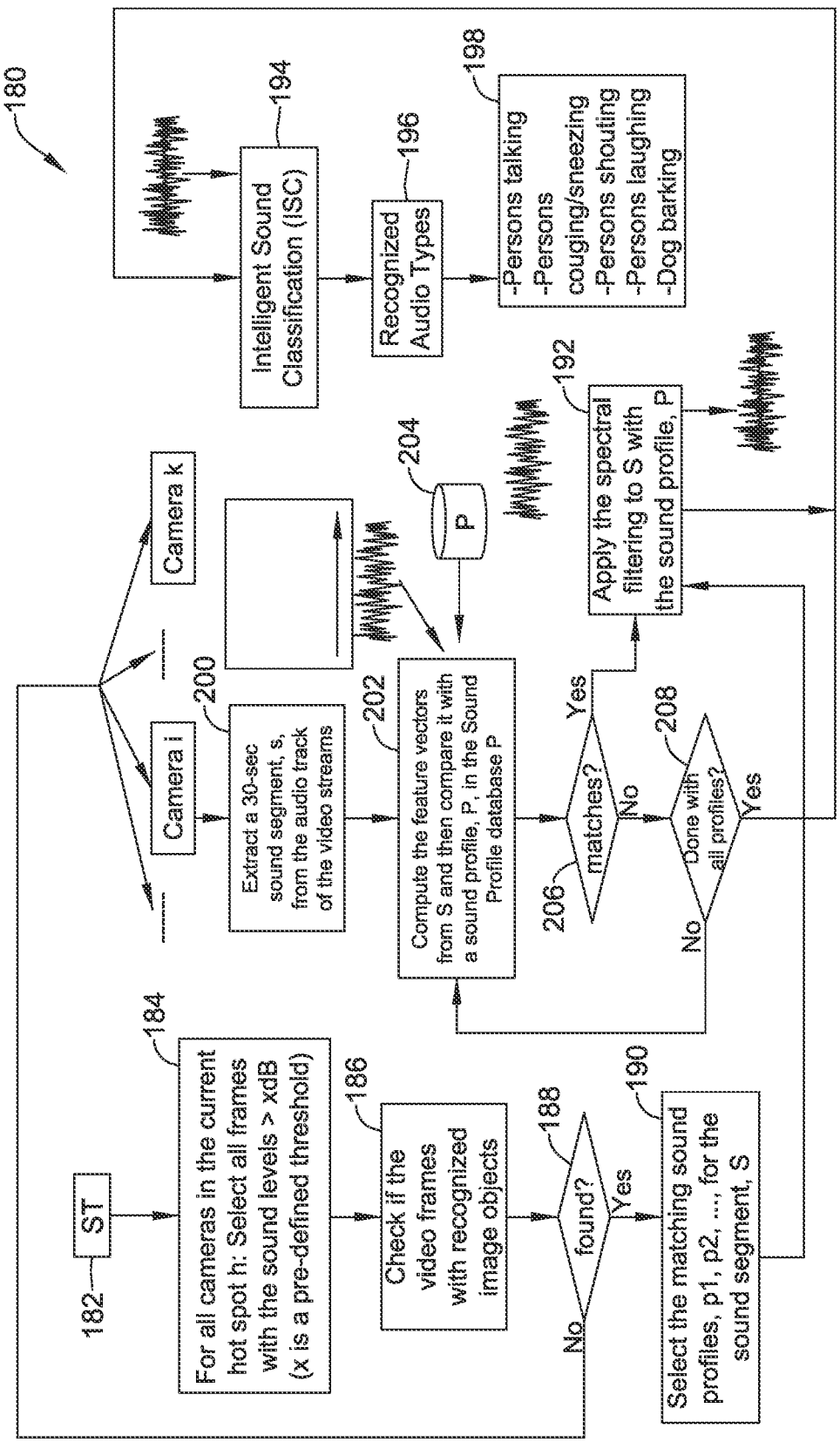

FIG. 11 shows a method 180 that starts at a START point 182. For all cameras in a particular hot spot, all frames having a sound level that exceeds a threshold are selected, as indicated at block 184. The selected frames are checked for recognized image objects, as indicated at block 186. At decision block 188, a determination is made as to whether any recognized image objects were found. If so, control passes to block 190, where matching sound profiles for the identified image objects are selected. Control is then passed to block 192, where spectral filtering is applied to the sound segment captured temporally with the identified image objects using the matching sound profiles. Control then passes to block 194, where ISC (Intelligent Sound Classification) occurs. As indicated at block 196, there are a number of recognized audio types that may be selected within the ISC block 194. These include people talking, people coughing or sneezing, people yelling or shouting, and dogs barking, as referenced at information block 198.

Returning briefly to decision block 188, if no recognized image objects are found, control passes to block 200, which receives video streams from the cameras. In this example, a 30 second sound segment is extracted from the audio track of the video streams. At block 202, feature vectors may be computed and then compared with a sound profile within a sound profile library, which may be stored at 204. Control then passes to decision block 206, where a determination is made as to whether there is a match with one or more of the sound profiles in the sound profile library. If there is a match, control passes to block 192, discussed above. Otherwise, control passes to a decision block 208, where a determination is made as to whether all of the profiles in the sound profile library have been checked to see if they match. If not, control reverts to block 202. Otherwise, control passes to the ISC block 194.

Figure 12:
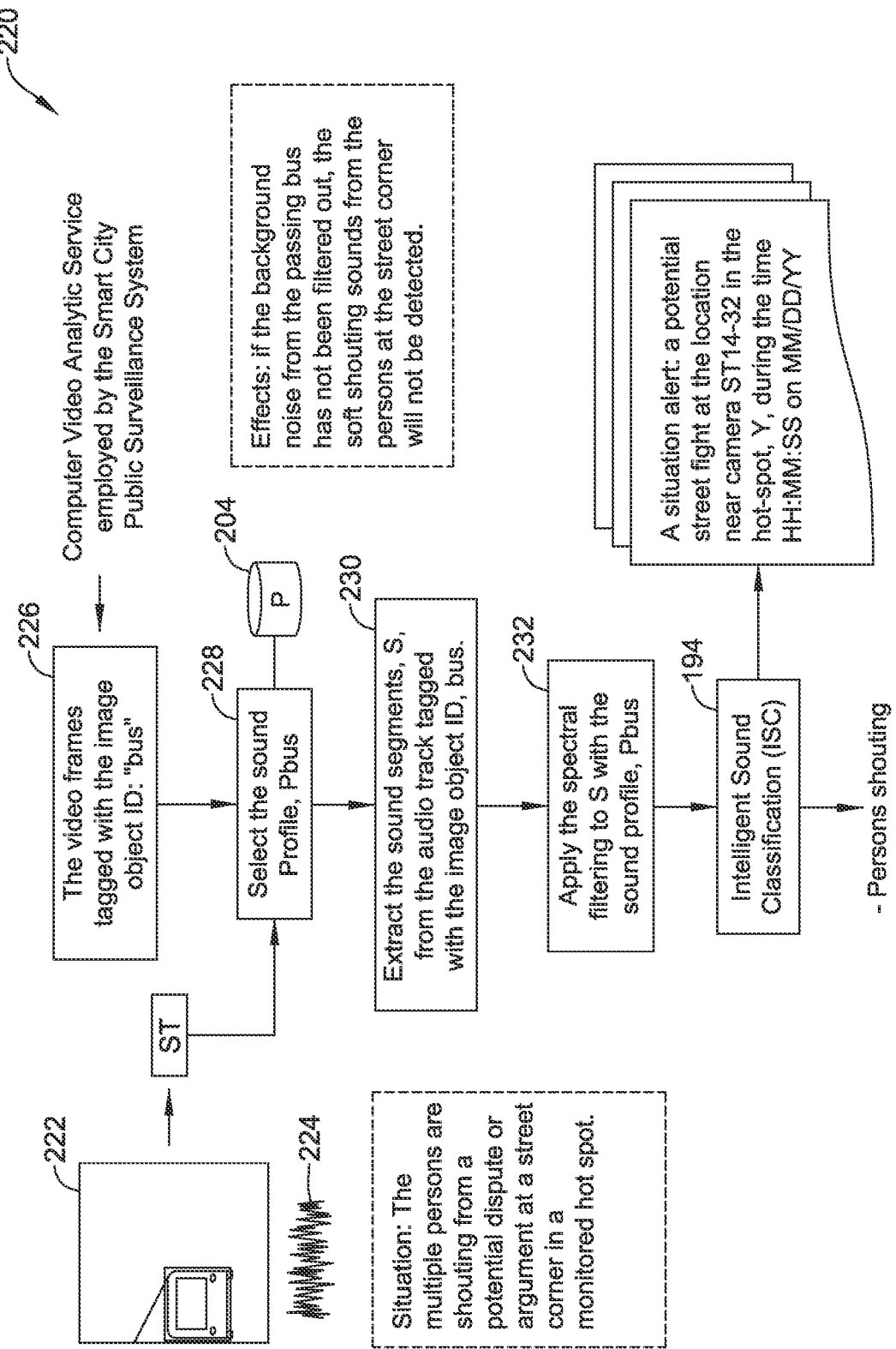
FIG. 12 is a flow diagram showing an illustrative example.

FIG. 12 is a flow diagram showing an illustrative example 220. In this particular example, there are multiple people shouting from a potential dispute or argument at a street corner in a monitored hot spot. A video frame shows a bus, as seen in an image 222, with a corresponding sound segment 224. The video frames are tagged with the image object ID "bus", as indicated at block 226. A corresponding sound profile for the bus may be selected from the memory 204, as indicated at block 228. The sound segment 224 is extracted from the captured audio track, as indicated at block 230. Spectral filtering is applied to the sound segment 224 based on the sound profile for the bus at block 232, and the results are provided to the ISC block 194. ISC block 194 determines that there is a potential fight at that location, as the ISC block 194 is able to detect the shouting, which is relatively low decibel, now that the sounds of the noisy bus have been removed from the sound segment 224.

Figure 13:
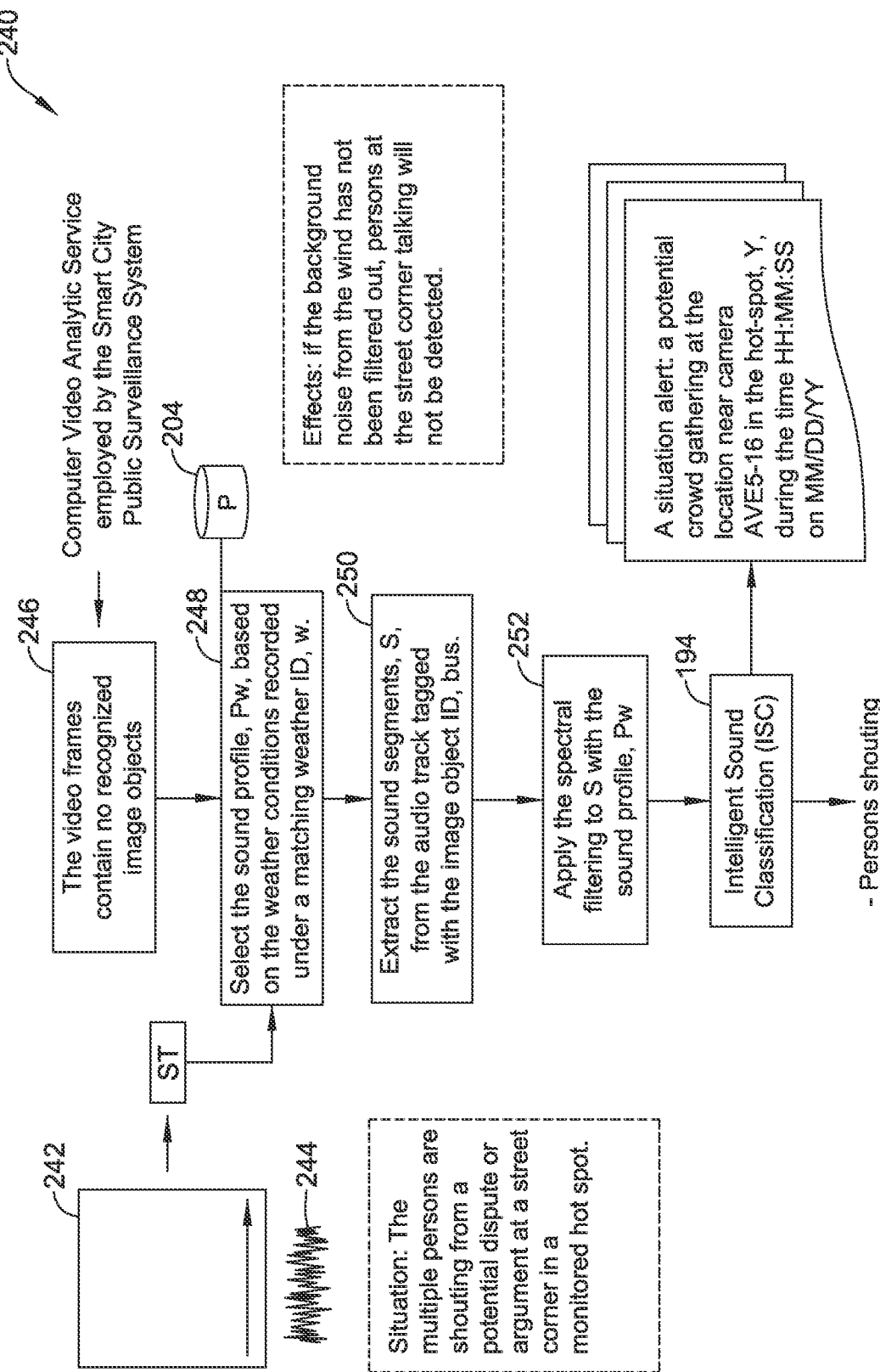
FIG. 13 is a flow diagram showing an illustrative example.

FIG. 13 is a flow diagram showing an illustrative example 240. In this particular example, there is a small crowd gathered at a street corner at a monitored hot spot at night, with very low visibility. The people are talking with a loud background noise caused by wind. A video frame 242 shows very little, given the poor lighting. As indicated at block 246, the video frames contain no recognized image objects. At block 248, a sound profile may be selected based on the current weather conditions. At block 250, the sound segment is extracted from the audio track. Spectral filtering is applied to the sound segment based on the selected weather sound profile at block 252, and the results are provided to the ISC block 194. ISC block 194 determines that people are talking. If the background noise from the wind had not been filtered out, it would have been difficult or even impossible to detect the voices of the people talking.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for identifying activity in an area even during periods of poor visibility, the method utilizing a video camera and an audio sensor, the method comprising:
   capturing a legible video using the video camera;
   processing the legible video to identify one or more visible events of interest;

determining a sound profile for each of the identified visible events of interest based on sounds captured by the audio sensor during the corresponding identified visible event of interest;

associating each of the identified visible events of interest with the corresponding sound profile;

identifying a subsequent sound event in a subsequent audio stream captured by the audio sensor;

determining whether a legible video was captured by the video camera of the identified sound event;

when no legible video was captured by the video camera of the identified sound event, comparing one or more sound characteristics of the subsequent sound event with the sound profiles associated with each of the identified visible events of interest, and when there is a match, filtering out one or more matching sound profiles from the subsequent audio stream, resulting in a filtered audio stream;

analyzing the filtered audio stream for one or more sounds of interest; and identify an abnormality in the one or more sounds of interest, and in response, issue an alert.

2. The method of claim 1, wherein the legible video was not captured by the video camera of the identified sound event because of low lighting.

3. The method of claim 1, wherein the legible video was not captured by the video camera of the identified subsequent sound event because a field of view of the video camera did not show a source of the subsequent sound event.

4. The method of claim 1, wherein the subsequent sound event comprises a sound that exceeds a threshold sound level.

5. The method of claim 1, wherein processing the legible video to identify one or more visible events of interest comprises:

processing the legible video to detect a moving object;

when no moving objects are detected, receiving weather information to identify a weather condition;

capturing sounds temporally with the identified weather condition; and associating the identified weather condition with a corresponding sound profile.

6. The method of claim 1, wherein determining the sound profile for each of the identified visible events of interest includes computing an audio feature vector for the sounds that occurred during the corresponding identified visible event of interest.

7. The method of claim 6, wherein the audio feature vector includes one or more spectral components, and wherein filtering out one or more matching sound profiles from the subsequent audio stream comprises applying spectral filtering to the subsequent audio stream based on the one or more spectral components of the matching sound profiles.

8. The method of claim 1, wherein processing the legible video to identify one or more visible events of interest comprises identifying one or more moving objects in the legible video.

9. The method of claim 8, wherein determining the sound profile for at least some of the identified visible events of interest comprises:

identifying sounds captured by the audio sensor that occurred temporally with the identified one or more moving objects; and determining the sound profile based on the identified sounds that occurred temporally with the identified one or more moving objects.

10. The method of claim 1, further comprising:

identifying an event type from a plurality of event types for each of the identified visible events of interest;

associating each of the identified visible events of interest, the corresponding identified event type and the corresponding sound profile; and combining at least some of the sound profiles into a single sound profile for identified visible events of interest of the same event type.

11. The method of claim 1, wherein the one or more sounds of interest include one or more of talking, shouting, chanting, screaming, laughing, sneezing, coughing, walking footsteps, and running footsteps.

12. A non-transitory computer-readable storage medium having stored thereon instructions that when executed by one or more processors, causes the one or more processors to:

store a plurality of video streams, where each video stream includes or is associated with a corresponding audio stream;

perform video analytics on the stored video streams to detect and identify events of interest within the stored video streams;

for each of the identified events of interest, determine a sound profile of sounds that occurred during the identified event of interest;

save the sound profile for each of the identified events of interest to an audio library, the audio library associating each of the identified events of interest with the corresponding sound profile;

store a subsequently captured audio stream that was captured when a corresponding video stream was not useful to identify activity;

search the subsequently captured audio stream for sounds that match one or more of the sound profiles in the audio library;

filter out one or more matching sound profiles from the subsequently captured audio stream, resulting in a filtered audio stream; and analyze the filtered audio stream for one or more sounds of interest.

13. The non-transitory computer-readable storage medium of claim 12, wherein the instructions, when executed by one or more processors, causes the one or more processors to:

identify an event type from a plurality of event types for each of the identified events of interest;

the audio library associating each of the identified events of interest, the corresponding identified event type and the corresponding sound profile; and combine at least some of the sound profiles into a single sound profile for identified events of interest of the same event type.

14. The non-transitory computer-readable storage medium of claim 12, wherein:

performing video analytics on the stored video streams to detect and identify events of interest within the stored video streams comprises analyzing a stored video stream to find a moving object; and for each of the identified events of interest that correspond to a moving object, determining the sound profile based on sounds occurred temporally with the moving object.

15. The non-transitory computer-readable storage medium of claim 14, wherein the instructions, when executed by one or more processors, causes the one or more processors to:

determine when a sound level exceed a sound threshold, and in response:
  perform video analytics on the stored video streams to detect and identify events of interest that correspond to one or more moving objects in the stored video streams;
  when no moving objects are detected, receive weather information and using the weather information to identify a weather event of interest;
  for each of the identified weather events of interest, determine a sound profile from the corresponding audio stream using sounds that occurred temporally to the corresponding weather event of interest; and
  save the sound profile for each of the identified weather events of interest to the audio library.

16. The non-transitory computer-readable storage medium of claim 12, wherein determining the sound profile from the corresponding audio stream using sounds that occurred during the identified event of interest comprises computing an audio feature vector for the sounds that occurred during the identified event of interest.

17. The non-transitory computer-readable storage medium of claim 12, wherein the one or more sounds of interest include one or more of talking, shouting, chanting, screaming, laughing, sneezing, coughing, walking footsteps, and running footsteps.

18. The non-transitory computer-readable storage medium of claim 12, wherein the instructions, when executed by one or more processors, causes the one or more processors to identify an abnormality in the one or more sounds of interest, and in response, issue an alert.

19. A system for identifying activity in an area even during periods of poor visibility, the system comprising:
  a video camera;
  an audio sensor;
  a processor operatively coupled to the video camera and the audio sensor, the processor configured to:
  store a legible video from the video camera; process the legible video to identify one or more visible events of interest;
  determine a sound profile for each of the identified visible events of interest based on sounds captured by the audio sensor during the corresponding identified visible event of interest;
  associate each of the identified visible events of interest with the corresponding sound profile;
  identify a subsequent sound event in a subsequent audio stream captured by the audio sensor;
  determine whether a legible video was captured by the video camera of the identified sound event;
  when no legible video was captured by the video camera of the identified subsequent sound event, compare one or more sound characteristics of the subsequent sound event with the sound profiles associated with each of the identified visible events of interest, and when there is a match, filter out one or more matching sound profiles from the subsequent audio stream, resulting in a filtered audio stream; and
  analyze the filtered audio stream for one or more sounds of interest.

20. The system of claim 19, wherein the processor comprises a server that is operatively coupled to the video camera and the audio sensor via a network.

* * * * *